US012802549B2

(12) United States Patent
Kahler

(10) Patent No.: US 12,802,549 B2
(45) Date of Patent: Nov. 17, 2026

(54) SYSTEM AND METHOD OF DETERMINING UNUSUAL OR EMERGENCY OCCURRENCES WITHIN A LIVESTOCK PROPERTY

(71) Applicant: Andrew Kahler, Geham (AU)

(72) Inventor: Andrew Kahler, Geham (AU)

( * ) Notice: Subject to any disclaimer, the term of this patent is extended or adjusted under 35 U.S.C. 154(b) by 9 days.

(21) Appl. No.: 19/121,783

(22) PCT Filed: Oct. 13, 2023

(86) PCT No.: PCT/AU2023/051014

§ 371 (c)(1),
(2) Date: Apr. 16, 2025

(87) PCT Pub. No.: WO2024/081999

PCT Pub. Date: Apr. 25, 2024

(65) Prior Publication Data

US 2026/0134767 A1 May 14, 2026

(30) Foreign Application Priority Data

Oct. 17, 2022 (AU) ................................ 2022903033

(51) Int. Cl.

| | |
|---|---|
| ***G08B 21/18*** | (2006.01) |
| ***G08B 1/08*** | (2006.01) |
| ***G08B 23/00*** | (2006.01) |
| ***H04W 4/029*** | (2018.01) |
| ***H04W 4/38*** | (2018.01) |
| ***H04W 4/90*** | (2018.01) |

(52) U.S. Cl.

CPC ............ *G08B 21/18* (2013.01); *H04W 4/029* (2018.02); *H04W 4/38* (2018.02)

(58) Field of Classification Search

CPC ...................................................... G08B 21/18

See application file for complete search history.

(56) References Cited

U.S. PATENT DOCUMENTS 10,045,511 B1 8/2018 Yarden et al.
10,595,183 B2 3/2020 MacGabann
2014/0057590 A1 * 2/2014 Romero ................. G08B 25/08 455/404.2

(Continued)

FOREIGN PATENT DOCUMENTS

AU 2021104227 B4 9/2021
KR 101941527 B1 1/2019

(Continued)

OTHER PUBLICATIONS

Nov. 21, 2023 International Search Report issued in International Patent Application No. PCT/AU2023/051014.

(Continued)

*Primary Examiner* — Davetta W Goins
*Assistant Examiner* — Pameshanand Mahase
(74) *Attorney, Agent, or Firm* — Williams Mullen; R. Brian Drozd

(57) ABSTRACT

The present invention relates to a computer-implemented system and method of determining unusual occurrences and/or emergency conditions within predefined areas and/or with respect to predefined features located in one or more livestock properties, wherein such occurrences or emergencies will likely adversely impact livestock.

15 Claims, 7 Drawing Sheets

(56) References Cited

U.S. PATENT DOCUMENTS

| | | | | |
|---|---|---|---|---|
| 2017/0124853 | A1* | 5/2017 | Mehta .................. | G08B 25/016 |
| 2019/0174289 | A1* | 6/2019 | Martin ................ | H04M 3/5141 |
| 2022/0083531 | A1* | 3/2022 | Buda ................... | G06F 16/2365 |

FOREIGN PATENT DOCUMENTS

| | | | |
|---|---|---|---|
| WO | 2011/082208 | A2 | 7/2011 |
| WO | 2019/245978 | A1 | 12/2019 |

OTHER PUBLICATIONS

Nov. 21, 2023 Written Opinion issued in International Patent Application No. PCT/AU2023/051014.

Nov. 249, 2024 International Preliminary Report on Patentability isued in International Patent Application No. PCT/AU2023/051014.

* cited by examiner

SYSTEM AND METHOD OF DETERMINING UNUSUAL OR EMERGENCY OCCURRENCES WITHIN A LIVESTOCK PROPERTY

FIELD OF THE INVENTION

The present invention relates to a computer-implemented system and method of determining unusual occurrences and/or emergency conditions within predefined areas and/or with respect to predefined features located in one or more livestock properties, wherein such occurrences or emergencies will likely adversely impact livestock.

BACKGROUND OF THE INVENTION

The purpose and benefits associated with cultivating livestock, such as cows, pigs, goats, sheep and chickens, are well known. Property holdings utilized for such purposes vary in size, from smaller holdings (e.g. family-owned farms) typically used to manage a small number of animals for food and agricultural purposes, to larger holdings (e.g. corporation-owned farm land) typically utilized for the purpose of mass-breeding animals for food and other products, including for export. Irrespective of the size and purpose of the land, such properties will typically be zoned such that each property includes a plurality of zones. Each zone will typically have a defined boundary and be utilized for a different purpose.

In a very basic example, one zone may be configured to enclose one type of livestock (e.g. cows), and an adjacent zone may be configured to enclose another type of livestock (e.g. goats). Furthermore, different zones include different boundary types depending upon their position, e.g. zones around the perimeter of a property may include boundaries defined by side roads, whereas zones closer to the centre of a property are likely to be surrounded by other zones.

Each zone may also include one or more fixed features that enable the farm to operate, including but not limited to fixed structures providing shelter such as sheds, and fixed structures providing storage such as water and feed storage tanks.

A problem that is typically experienced by operators of farms is the lack of any computer-implemented real-time assistance to efficiently monitor unusual occurrences and/or emergency situations arising in individual zones or with respect to individual fixed features within their livestock properties. As a result, such operators typically fail to detect such occurrences which may adversely impact livestock and hence the viability of the farm. For example, a boundary fence between a first and second zone may become damaged or broken, enabling livestock to travel between zones, or become lost or stolen. In circumstances where a livestock property owner is not alerted immediately and/or provided details regarding the nature and location of the occurrence, it can become too late for remedial action to be conducted effectively.

In another example, one zone of a property may be experiencing an emergency such as a flood or bushfire whilst adjacent zone may not be experiencing the emergency. In circumstances where the property owner (or person associated therewith) intends to move livestock through the emergency zone, there is currently no means known to the Applicant for alerting the owner to the emergency situation in the relevant zone and therefore be provided with an option to address the flooding or bushfire, or at least travel an alternate path around the emergency zone.

The ability to respond quickly to unusual occurrences or emergency situations such as those described above is very important with respect to farm and livestock management, since damage to property, loss of livestock, livestock injury/death, etc, may become preventable, and therefore any adverse impact arising from same, including with respect to the farm's future viability, is significantly reduced.

Accordingly, there exists a need for a system and method that addresses, or at least ameliorates, one or more of the abovementioned problems.

The reference to any prior art in this specification is not, and should not be taken as, an acknowledgement or any suggestion, that the prior art forms part of the common general knowledge.

SUMMARY OF THE INVENTION

In one aspect, the present invention provides a computer-implemented method of determining and displaying details regarding unusual occurrences and/or emergency conditions within a livestock property, the method including, receiving, by one or more processors, property data from or on behalf of a user in relation to one or more properties, the property data including, boundary details defining an area of land within the property and different zones within the area of land, and details relating to any fixed features of the one or more properties, receiving, by one or more processors, livestock data from or on behalf of the user, the livestock data including, details relating to livestock on the one or more properties, including livestock associated with each identified zone, communicating, by one or more processors, with a plurality of sensors disposed across the one or more properties and/or with one or more external third party services, each configured to monitor an unusual occurrence and/or emergency condition associated with one or more of the different zones and/or the fixed features of the one or more properties, processing, by one or more processors, data from the plurality of sensors and/or external third party services to determine any unusual occurrence and/or emergency situation which has occurred, or is occurring, within one or more of the different zones or with respect to the fixed features, and generating, by one or more processors, a graphical user interface (GUI) viewable on a device associated with the user, the GUI including a visualisation of the area of land of the property, including indication(s) of the fixed features and the boundaries that define the different zones, and the type and location of the unusual occurrence or emergency condition.

In an embodiment, processing data received from the plurality of sensors and/or external third party services to determine an unusual occurrence and/or emergency situation which has occurred, or is occurring, within one or more of the different zones or with respect to the fixed features of the one or more properties, includes, applying, by one or more processors, one or more artificial intelligence techniques to the received data, the artificial intelligence techniques configured to, generate outputs regarding the most likely unusual occurrence and/or emergency situation which occurred, or is occurring, within one or more of the different zones or with respect to the fixed features, and generate a severity score for each detected unusual occurrence and/or emergency situation.

In an embodiment, the outputs regarding the most likely unusual occurrence and/or emergency situation which occurred, or is occurring, within one or more the different zones or with respect to the fixed features includes, unusual movement of livestock, cessation of movement of livestock, entry of livestock into a different zone, missing livestock, damage detected to a fixed feature, wildfire, flood, road block, earthquake, water damage, and extreme weather event including strong winds, typhoon and/or tsunami.

In an embodiment, the method further includes, receiving, by one or more processors, feedback data from the user regarding the accuracy or otherwise regarding the generated outputs, training, based on the received property and livestock data, the generated outputs, and the received feedback data, a machine learning model configured to receive new or updated property and livestock data and generate new or updated outputs regarding the most likely unusual occurrence and/or emergency situation which occurred, or is occurring, within one or more different zones or with respect to the fixed features.

In an embodiment, the severity score is based on one or more of, a category of unusual occurrence and/or emergency situation that is detected, a number of livestock and/or humans detected at or within a predetermined vicinity of the particular location at which the unusual occurrence and/or emergency situation has been detected, a location of the property and/or zone in which the unusual occurrence and/or emergency situation has been detected and relative distance to particular fixed features of the property likely to exacerbate the unusual occurrence and/or emergency situation (eg. a wooden fence in a zone in which a fire has been detected), and a location of the property and/or zone in which the unusual occurrence and/or emergency situation has been detected and relative distance to a resource capable of being used to address the unusual occurrence and/or emergency situation.

In an embodiment, the resource that is capable of being used to address the unusual occurrence and/or emergency situation includes one or more of, particular fixed features of the property likely to assist the user to address the unusual occurrence and/or emergency (eg nearby water storage for use in fighting a fire in a particular zone), and one or more external emergency services.

In an embodiment, the method further includes an alert to the user based upon detection of an unusual occurrence and/or emergency situation, wherein a particular alert level is selected based on the determined severity score. For example, where a road is located adjacent to a broken fence through which livestock is escaping, the GUI may provide a high level alert.

In an embodiment, the method further includes, generating, by one or more processors, one or more recommendations relating to remedial action recommended to address the unusual occurrence and/or emergency condition, wherein the recommendation(s) are based on one or more of, the category of unusual occurrence and/or emergency situation that is detected, the severity score determined for the unusual occurrence and/or emergency condition detected, whether any of the one or more external emergency services is determined as useful to address the unusual occurrence and/or emergency condition, the location of the one or more external emergency services determined as useful to address the unusual occurrence and/or emergency condition (eg. the location of a fire station, police station, ambulance service, etc), whether any of the fixed features of the property in which the unusual occurrence and/or emergency condition has been detected is determined as useful to address the unusual occurrence and/or emergency condition, and the location of the fixed features which are determined as useful to addressing the unusual occurrence and/or emergency condition (eg. the location of water storage relative to a zone of the property in which a fire has been detected).

In an embodiment, the one or more external emergency services includes a police station, a fire station, and a hospital.

In an embodiment, the fixed features of the one or more properties include one or more of, water outlets, water and/or feed storage tanks, roads, sheds, and fencing.

In an embodiment, the method further includes, prompting, by one or more processors, the user to register to use an application that is accessible on the user device, the application enabling the user to upload the property data and livestock data during a registration process, and/or prompting, by one or more processors, the user to register to use an application that is accessible on the user device, the application enabling the user to retrieve the property data and livestock data from an external source.

In an embodiment, the external third party service configured to monitor an unusual occurrence and/or emergency condition includes an emergency authority whose data systems are accessible using an application programming interface (API) enabling live data exchange.

In an embodiment, the plurality of sensors disposed across the one or more properties include one or more of, internet of things (IoT) devices, position sensors, animal thermal heat sensors, pressure sensors, temperature sensors, force sensors, vibration sensors, piezo sensors, fluid property sensors, visual sensors, and humidity sensors.

In an embodiment, the one or more sensors is attached directly to each livestock animal or to a fixed or moving structure within a predetermined distance of the livestock animals to enable the location and movement of the livestock to be tracked by the one or more sensors and included in the displayed visualisation of the area of land of the property.

In an embodiment, communication with the user device is via an available WIFI or cell signal communication service.

In an embodiment, where WIFI and cell signal communication services are unavailable, the communication with the user device is automatically re-directed such that the user device continues to generate the GUI using an alternative wireless service.

In an embodiment, the alternative wireless service is a satellite-based service.

In an embodiment, the method further includes, determining, by one or more processors, the strongest satellite reception available based on analysing a plurality of available satellite receptions, and selecting, by one or more processors, the strongest satellite reception available to effect the communication.

In another aspect, the present invention provides a computer-implemented system for determining and displaying details regarding unusual occurrences and/or emergency conditions within a livestock property, the system including, one or more processors configured to, receive property data from or on behalf of a user in relation to one or more properties, the property data including, boundary details defining an area of land within the property and different zones within the area of land, and details relating to any fixed features of the one or more properties, receive livestock data from or on behalf of the user, the livestock data including, details relating to livestock on the one or more properties, including livestock associated with each identified zone, communicate with a plurality of sensors disposed across the one or more properties and/or with one or more external third party services, each configured to monitor an unusual occurrence and/or emergency condition associated with one or more of the different zones and/or the fixed features of the one or more properties, process data from the plurality of sensors and/or external third party services to determine any unusual occurrence and/or emergency situation which has occurred, or is occurring, within one or more of the different zones or with respect to the fixed features, and generate a graphical user interface (GUI) viewable on a device associated with the user, the GUI including a visualisation of the area of land of the property, including indication(s) of the fixed features and the boundaries that define the different zones, and the type and location of the unusual occurrence or emergency condition.

In a still further aspect, the present invention provides a computer-readable medium having a plurality of instructions executable by one or more processors of a computing device for determining and displaying details regarding unusual occurrences and/or emergency conditions within a livestock property, the instructions including, receiving property data from or on behalf of a user in relation to one or more properties, the property data including, boundary details defining an area of land within the property and different zones within the area of land, and details relating to any fixed features of the one or more properties, receiving livestock data from or on behalf of the user, the livestock data including, details relating to livestock on the one or more properties, including livestock associated with each identified zone, communicating with a plurality of sensors disposed across the one or more properties and/or with one or more external third party services, each configured to monitor an unusual occurrence and/or emergency condition associated with one or more of the different zones and/or the fixed features of the one or more properties, processing data from the plurality of sensors and/or external third party services to determine any unusual occurrence and/or emergency situation which has occurred, or is occurring, within one or more of the different zones or with respect to the fixed features, and generating a graphical user interface (GUI) viewable on a device associated with the user, the GUI including a visualisation of the area of land of the property, including indication(s) of the fixed features and the boundaries that define the different zones, and the type and location of the unusual occurrence or emergency condition.

In a yet further aspect, the present invention provides a portable electronic device for determining and displaying details regarding unusual occurrences and/or emergency conditions within a livestock property, the device including, a touch screen configured to receive an input corresponding to a touch operation of the user on an area of the touch screen, and a processor connected to the touch screen, wherein the processor is configured to detect the input to the touch screen and perform operations including, detecting a first input, via the touch screen, of, property data from or on behalf of a user in relation to one or more properties, the property data including, boundary details defining an area of land within the property and different zones within the area of land, and details relating to any fixed features of the one or more properties, and livestock data from or on behalf of the user, the livestock data including, details relating to livestock on the one or more properties, including livestock associated with each identified zone, automatically communicating with a plurality of sensors disposed across the one or more properties and/or with one or more external third party services, each configured to monitor an unusual occurrence and/or emergency condition associated with one or more of the different zones and/or the fixed features of the one or more properties, detecting a second input, via the touch screen, of a request for information regarding any unusual occurrence or emergency condition processing data from the plurality of sensors and/or external third party services to determine any unusual occurrence and/or emergency situation which has occurred, or is occurring, within one or more of the different zones or with respect to the fixed features, and providing, for display on the touch screen, a graphical user interface (GUI) including a visualisation of the area of land of the property, including indication(s) of the fixed features and the boundaries that define the different zones, and the type and location of the unusual occurrence or emergency condition.

BRIEF DESCRIPTION OF THE DRAWINGS

Embodiments of the invention will now be described in further detail with reference to the accompanying Figures in which:

FIG. 6 illustrates an exemplary flow diagram of a process that enables the property owner to share graphical user interface alerts with other users including property managers, employees and the like.

DETAILED DESCRIPTION OF EMBODIMENT(S) OF THE INVENTION

Figure 1:
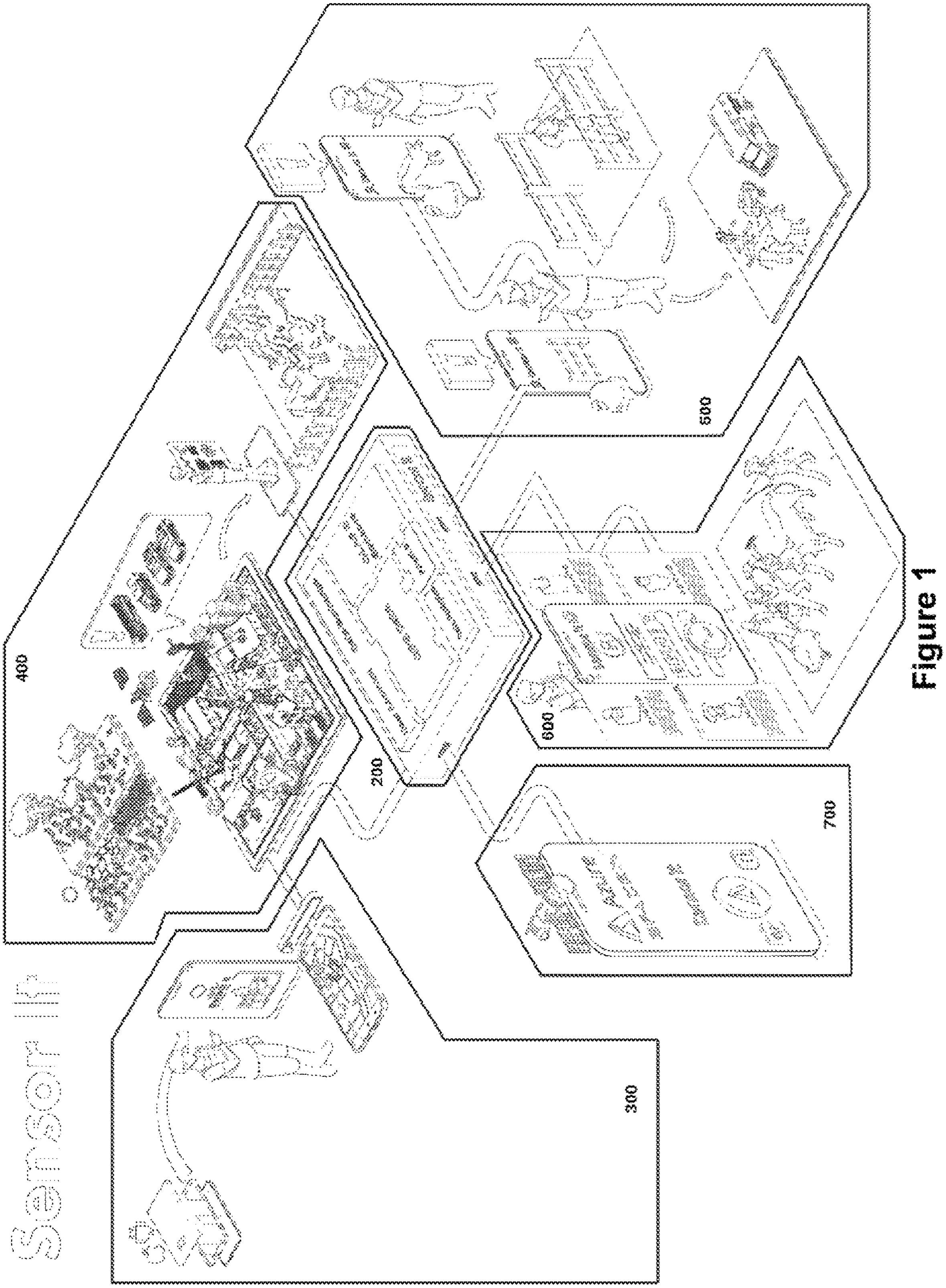
FIG. 1 provides an overview of a system according to an embodiment of the present invention showing, in particular, the interaction of various system components.

For simplicity and illustrative purposes, the present disclosure is described by referring to embodiment(s) thereof. In the following description, numerous specific details are set forth to provide a better understanding of the present disclosure. It will be readily apparent, however, that the current disclosure may be practiced without restriction to the specific details of the described embodiments. In other instances, some methods and structures have not been described in detail to avoid obscuring or un-necessarily complicating the present disclosure.

The present invention relates to a computer-implemented system and method of determining unusual occurrences (85) and/or emergency conditions (90) within a livestock property (55). The system and method provide a platform that hosts a computer-executable software application (40), wherein the application (40) is accessible by a plurality of registered users (30), including property owners or other users acting on their behalf (e.g. property managers and the like). In particular, the system utilises a central server (20) in communication with data communication devices (50) associated with each user (30).

The central server (20) maintains one or more processors and/or databases for performing functions, including receiving from a computing device (50) associated with a user (30), property data in relation to their one or more properties (55), wherein the property data includes boundary details defining a land area of the property (55) and different zones (65) within the land area, and/or details relating to one or more fixed features (70) (e.g. fences (70A), roads (70B), etc) of the one or more properties (55). The central server (20) further receives livestock data from or on behalf of the user (30), wherein the livestock data includes details relating to livestock (75) located on the one or more properties (55), including livestock (75) within each identified zone (65).

The unusual occurrence (85) and/or emergency condition (90) may be monitored using a plurality of sensors (80) and/or such data may be retrieved from one or more external third party services (not shown). Such occurrences (85) and/or conditions (90) will be associated with one or more of the different zones (65) and/or one or more of the fixed features (70). Based upon the retrieval and processing of such data, a particular unusual occurrence (85) and/or emergency situation (90) which has occurred or is occurring may be determined, and a graphical user interface (190) viewable on the device (50) of the user (30) will be generated such that the interface (190) includes a visualisation (180) of the land area of the property (55), including indication(s) of the one or more fixed features (70), the boundaries that define the different zones (65), and the type and location of the unusual occurrence (85) and/or emergency condition (90).

The skilled reader will appreciate that the platform provides a means by which livestock property owners may detect, substantially in real-time, any unusual occurrence (85) and/or emergency condition (90) within predefined areas and/or with respect to predefined features located in one or more of their livestock properties (55), where such occurrences and/or emergencies will likely adversely impact livestock (75). For example, by receiving alerts regarding an unusual occurrence such as a boundary fence (70A) between a first and second zone (65) of a property (55) becoming damaged or broken (potentially enabling livestock (75) to travel between zones, or become lost or stolen), the livestock property owner (30) is alerted and provided precise details regarding the nature and location of the occurrence, thereby enabling immediate remedial action.

In another example, one zone (65) of a property (55) may be experiencing an emergency such as a flood whilst other adjacent zones (65) display no signs of an emergency. In circumstances where the property owner (or person associated therewith) intends to move livestock (75) across the zones (65), the user may be alerted to the flooding in the affected zone and is therefore provided with an opportunity to address the flooding or at least travel around the affected zone (65).

Accordingly, technical problems associated with known platforms failing to provide focused and prompt feedback regarding unusual occurrences/emergency situations arising in individual zones (65) or with respect to individual features (70) of a livestock property (55) may be addressed by the implementation of particular embodiments of the present invention.

FIG. 1 is divided into segments which are further expanded in subsequent FIGS. 2 to 7. In particular, Segment 200 shows the server component (20) with which the software application (40) operating on data communication devices (50) are configured to communicate. It will be apparent to the person skilled in the relevant field of technology that the software application (40) may be a mobile application or a web application, and similarly, the device (50) utilised by each user (30) may be a portable device such as a mobile phone, tablet or laptop, or alternatively a fixed location device such as a personal computer. The server component (20) is additionally detailed in FIG. 2.

The skilled person will appreciate that the steps described herein may be executed by the device (50) wherein such operations are facilitated by the software application (40) operating on each device. According to another implementation of the present invention, the server (20) is programmed to provide most or all of the functions described herein particularly where they cannot be provided locally on the user devices (50) or where it may be impractical to do so. In other words, the steps described herein as performed by the device (50), or components thereof, may be associated with hardware that is located externally of the device, such as the remote central server (20) for example (i.e. in a distributed architecture). Different arrangements are possible in this regard, and alternate variations will be apparent to the person skilled in the relevant field of technology.

Segment 300 of FIG. 1 shows a user (30) downloading and installing the application (40) and subsequently accessing the application (40) in order to establish an account and user profile, as further detailed in FIG. 3, with the ability to add/edit details in respect of their profile. Segment 400 of FIG. 1 illustrates how user (30) may establish a property profile by uploading and/or retrieving property and livestock data, which may include the location (60) of the property (55), the location of any sensors (80) positioned within the property, along with livestock (75) and fixed features (70) of the property, as further detailed in FIG. 4. Segment 500 of FIG. 1 illustrates examples of alert interfaces (190) which may be presented to users (30) along with recommendations to address particular occurrences and/or emergency conditions, as further detailed in FIG. 5. Segment 600 of FIG. 1 illustrates the ability of the software application (40) to enable user (30) to share particular alerts with other relevant persons including, for example, staff working on the property (55), property managers, etc, as detailed in FIG. 6. Finally, Segment 700 of FIG. 1 illustrates the ability of the software application (40) to enable alternative wireless service in the event of loss of WIFI or cell signal communications, as further detailed in FIG. 7.

As mentioned above, FIG. 2 shows in greater detail Segment 200 of Figure and, in particular, FIG. 2 shows the server component (20) which includes infrastructure upon which the platform of the present invention operates. The infrastructure may be local or cloud-based.

The central server (20) may operate one or more computer processors and maintain one or more databases to enable the following functionality and/or storage:

- User account register (100) storing user details such as name, age, address, contact details, identifiers (such as driver's license or passport details) and any additional data which may be relevant for the purpose of identifying each user (30);
- Data exchange functionality (105) handling the receipt and transmission of data, including the receipt of data uploaded by users (30) or data retrieved from one or more third party systems, including property data, livestock data, and any additional data relating to unusual occurrences and/or emergency conditions (in the event that such data is maintained by external third party services);

GPS location database (110) storing the location (60) of registered properties (55), the location of different zones (65) and fixed features (70) in each property, as well as the monitored location of moving assets such as moving livestock (75). It will be understood that the location of features, such as different zones (65) within a property (55) for example, may be defined in any number of ways. For example, the location of a zone (65) may be defined by boundaries of the zone (65) as specified in boundary data, wherein each zone may include GPS coordinates defining a central location of the zone (65) and/or boundary nodes associated with the zone (65). In general, the more detailed the location data regarding the different zones (65), the more accurate the results and recommendations presented to the user (30) through graphical user interfaces (190) will be (i.e results/recommendations regarding the location and remedial action that may be taken to address any unusual occurrence and/or emergency condition);

Sensor database (115) storing an inventory of sensors (80) including details relating to their location and their particular monitoring function;

Alerts functionality (120) enabling the generation and display of alert interfaces (190) in the event of a detected unusual occurrence (85) and/or emergency condition;

Data analytics functionality (130) for converting sensor data into data which identifies the particular unusual occurrence (85) and/or emergency condition (90) for subsequent presentation in the alert interfaces (190), as well as data which identifies remedial recommendations.

Figure 2:
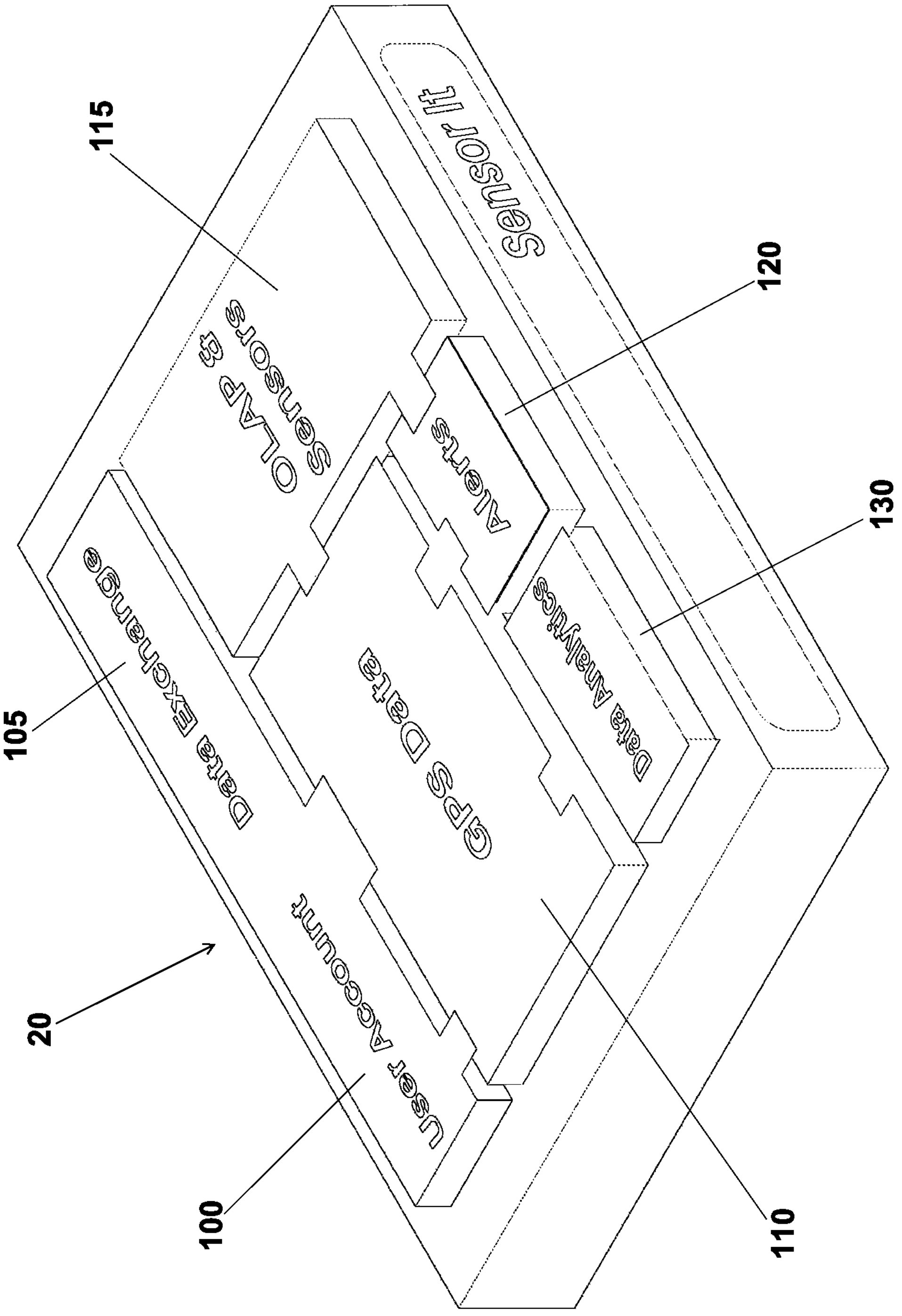
FIG. 2 illustrates a diagram associated with an exemplary server component within the system illustrated in FIG. 1.

FIG. 2 also depicts server (20) configured to enable communication (140) with the user devices (50) and, in particular, the software application (40) operating on each user device (50). Such communications may occur via the internet or similar network.

In the paragraphs that follow, a more detailed description of features illustrated in FIGS. 3 to 7 is provided.

Figure 3:
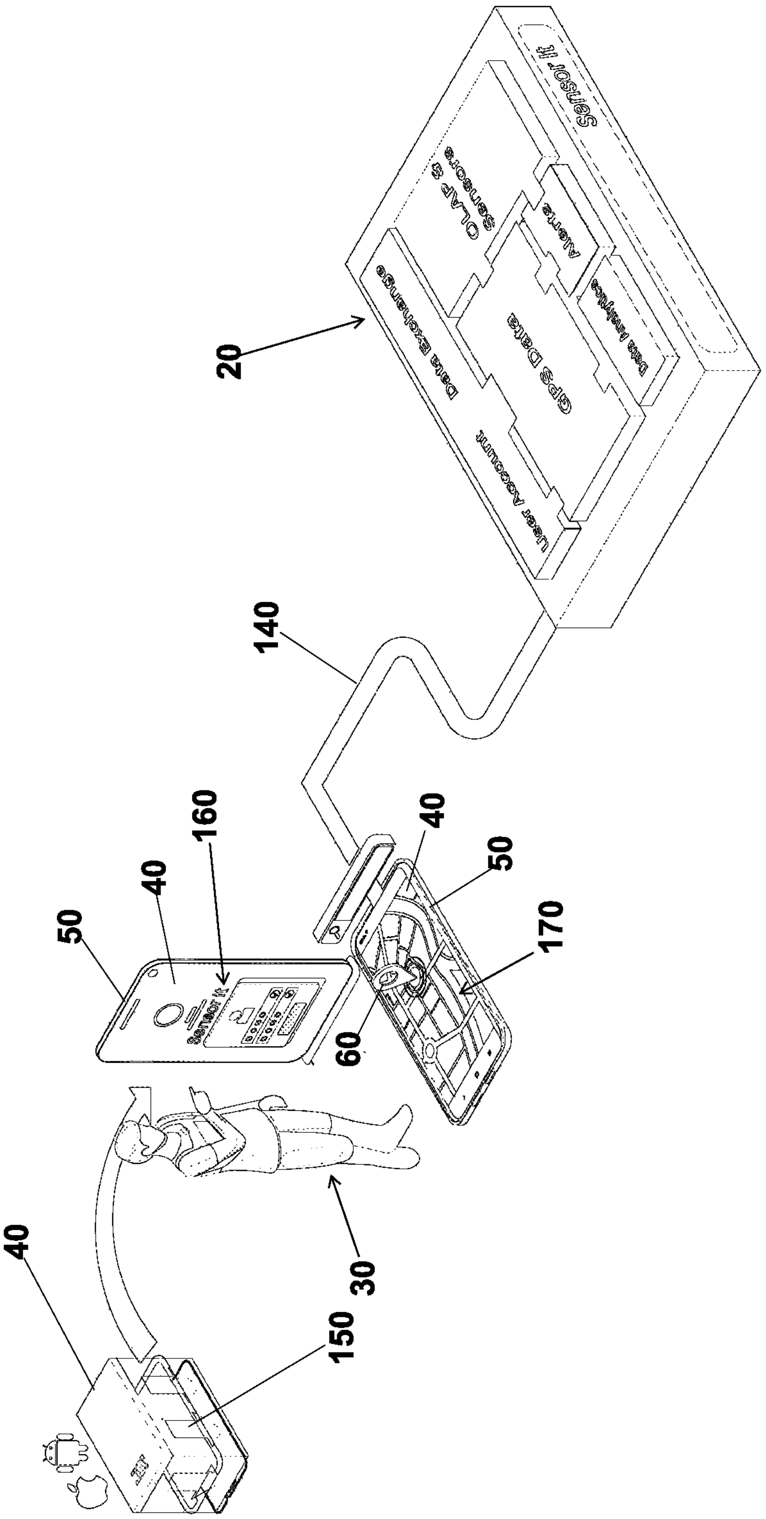
FIG. 3 illustrates an exemplary flow diagram of a process that enables a property owner to download and install a software application, and subsequently access, or register to use, the software application for interaction with the system illustrated in FIG. 1.

FIG. 3 shows in greater detail Segment 300 of FIG. 1 and, in particular, the steps associated with a user (30) installing the application (40), which may be achieved by downloading the application (40) from an application store. Each user (30) may create an account using the application (40), and the account information may be stored in the user account register (100). As described above, the user account register (100) may capture information sufficient to enable each user (30) to be correctly identified.

The process of installing the application (40) is indicated by arrow (150), and interface (160) is also shown which allows each user (30) to download and install the application (40) in order to access the functionality thereof, including to create and maintain a user profile and any associated property profiles. In other words, once the application (40) has been accessed by a user (30), the user (30) may be presented with an interface identical or similar to interface (160) to allow the user (30) to create and maintain a user profile and any associated property profiles, including providing the user (30) with the ability to add/edit such details. Upon uploading sufficient information, each user (30) will be successfully registered such that the user (30) becomes a registered user who may then utilise the functionality of the application (40), which may be in accordance with a subscription level of the user (30).

Interface (170) shown in FIG. 3 represents an example of a property profile interface including the particular location (60) of a property (55) in an interactive map. Whilst not shown, the interface (170) may profile various additional information relating to the property (55), including information according to any requests submitted by the user (30) through interface (170). Such requests may include a search request to enable the user (30) to locate one of a plurality of properties they have listed using the software application (40), or to access more specific information in relation to a selected property.

Figure 4:
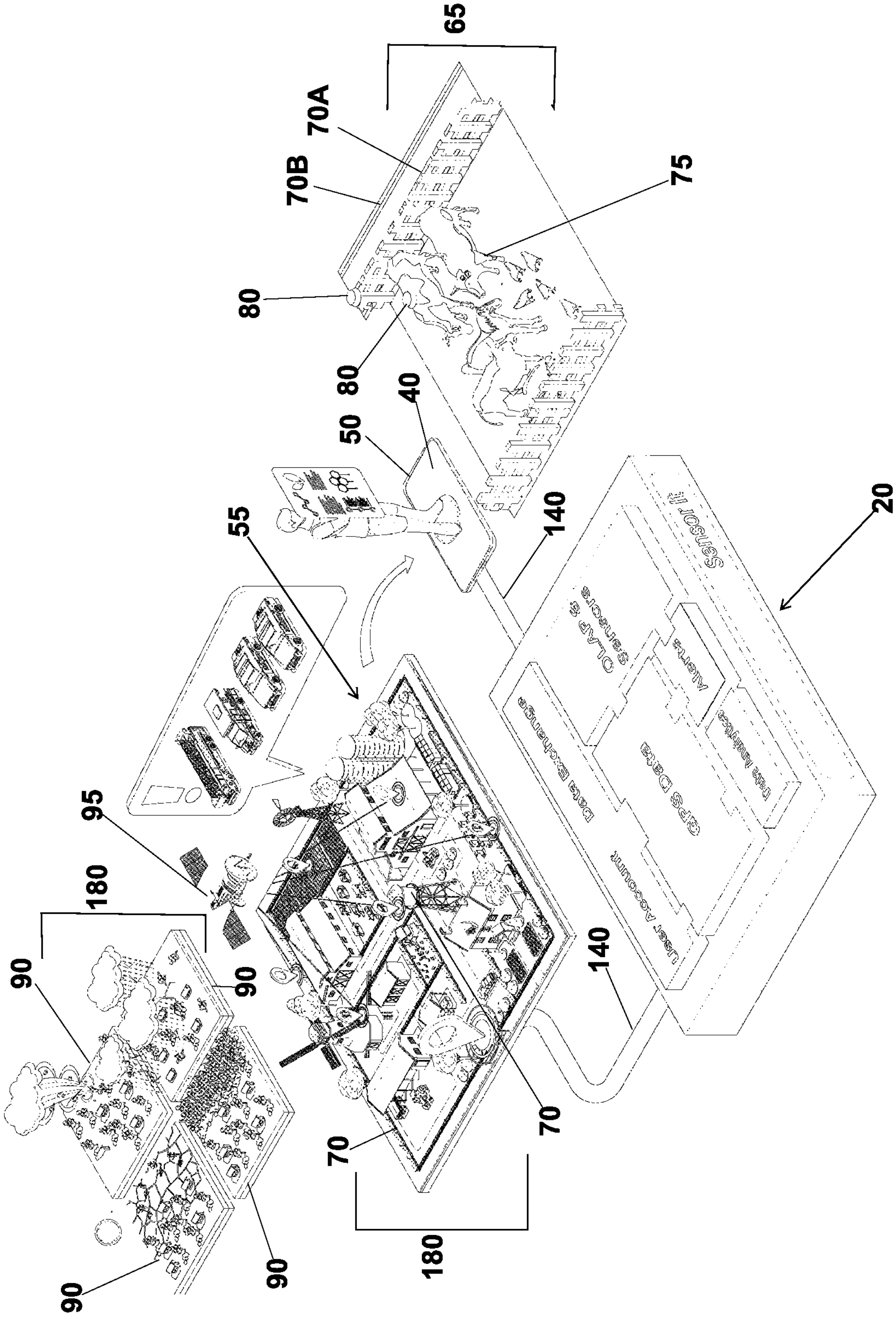
FIG. 4 illustrates an exemplary flow diagram of a process that enables a property owner to upload property and livestock data relevant to their one or more properties and be presented with a land area visualization with respect to a selected property, including zone boundary details and fixed features, as well as the presence of livestock located within each zone of the property.
Figure 5:
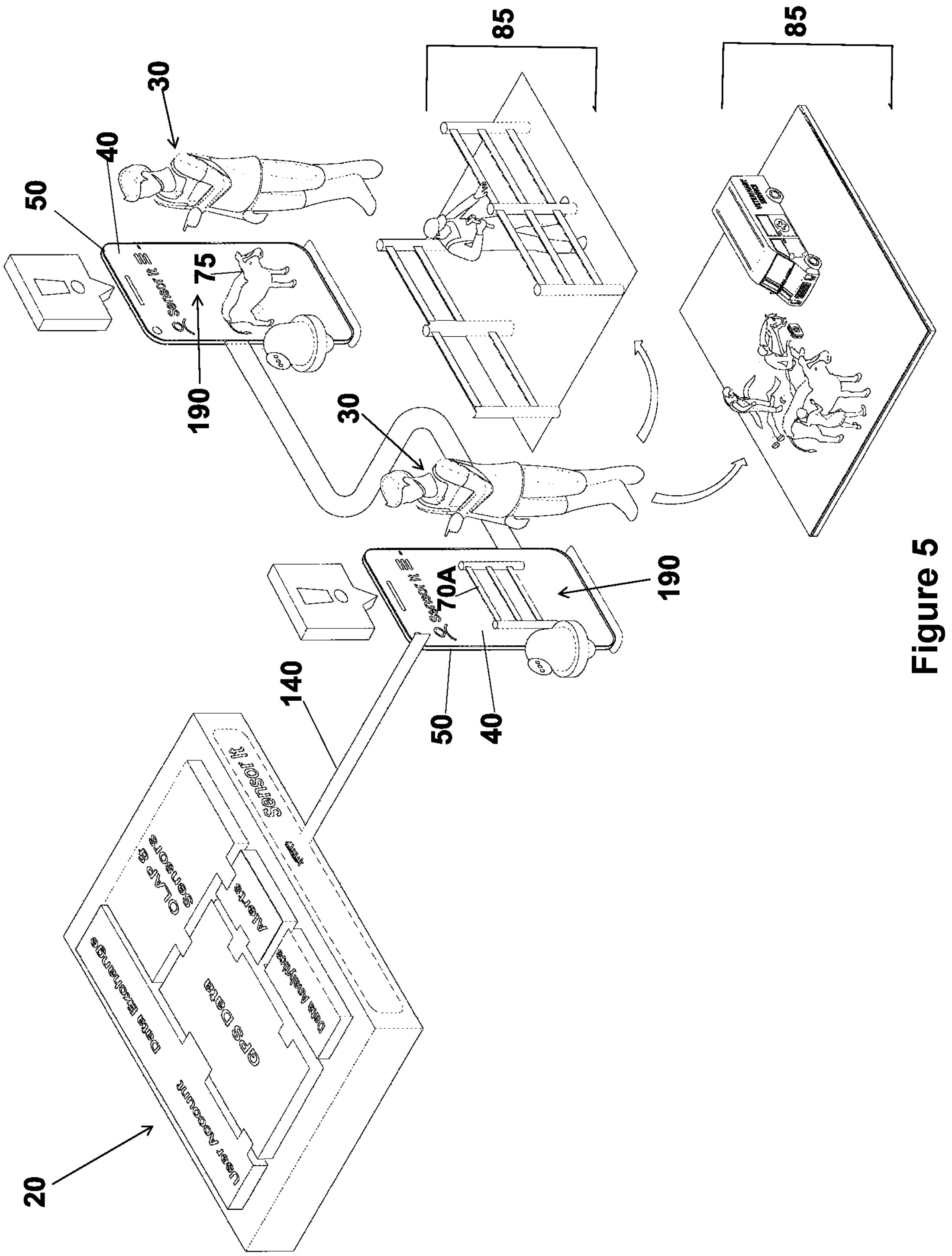
FIG. 5 illustrates an exemplary flow diagram of a process that enables the property owner to be presented with user interfaces representing alerts reflecting unusual occurrences and/or emergency conditions within one or more different zones or with respect to one or more fixed features of the property.
Figure 6:
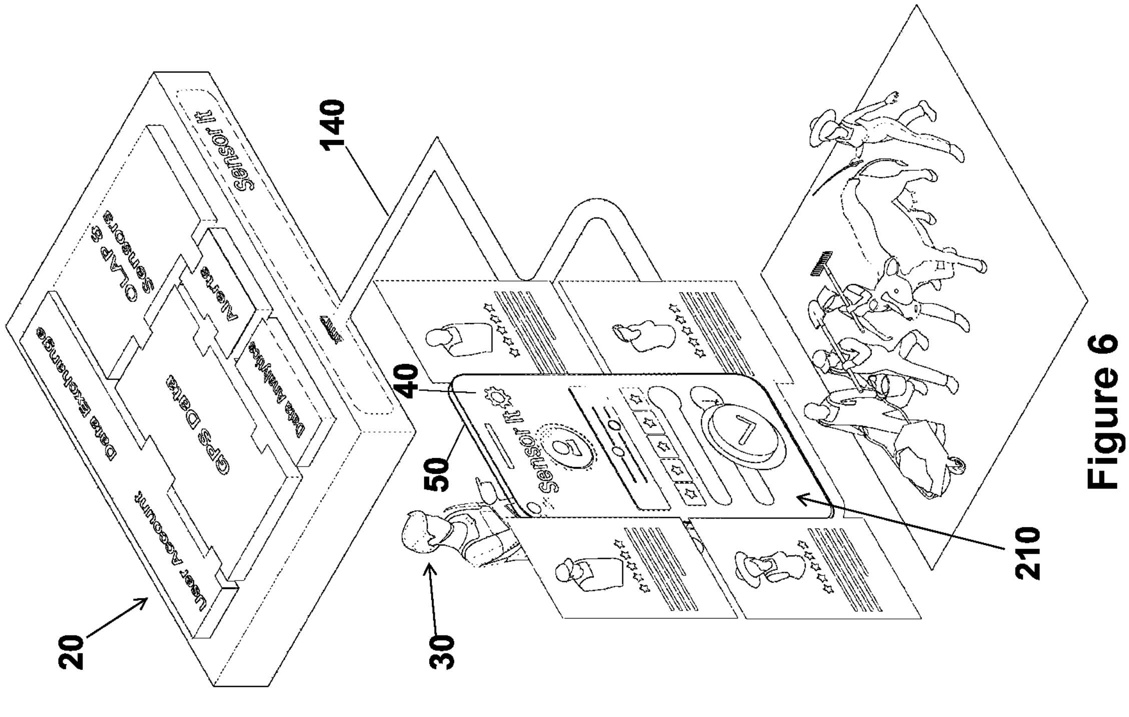

FIG. 4 shows in greater detail Segment 400 of FIG. 1 and, in particular, the use of the application (40) by user (30) to create a property profile in order to enable the user (30) to subsequently monitor the application (40) for unusual occurrences (85) and/or emergency conditions (90) associated with the particular property. Examples of unusual occurrences (85) may include one or more unusual movements of livestock, cessation of movement of livestock (75), entry of livestock (75) into a different zone (65), missing livestock, or damage detected to a fixed feature (70). As shown in FIG. 4, examples of emergency conditions (90) may include hazards such as wildfire, flood, road blocks, earthquakes, water damage, and extreme weather events including strong winds, typhoons and tsunamis.

In the case of emergency conditions (90), information and data generated by external third party services (not shown) may be monitored, such as information provided by emergency authorities whose data systems may be accessed via an application program interface (API) enabling live data exchange. Alternatively, the emergency conditions may be detected using sensors (80) on the property.

Once sufficient information has been uploaded by a user (30) in relation to a particular property, the platform may be utilised to generate a visualization (180) of the land area of the property (55) which may be depicted in one or more user interfaces of the software application (40). Examples of representations that illustrate particular emergency conditions (90) are shown in FIG. 4, and such representations may be visually displayed within the graphical user interface, e.g. at the time such conditions are detected. The visualization (180) may also enable a user (30) to enlarge particular zones (65) within the property in order to view statistics and/or other information relating to the particular zone including in relation to livestock (75) located within the zone (65). Such information may be generated based on the monitoring of different zones (65) using one or more sensors (80).

The plurality of sensors (80) disposed across the property (55), which may be used to determine, or assist in determining the existence of a particular unusual occurrence (85) and/or emergency situation (90), may include any suitable sensor for monitoring relevant parameters that require monitoring in order to form relevant conclusions regarding particular occurrences (85) or conditions (90) within each zone (65). In this regard, the sensors (80) may include, but are not limited to, position sensors, animal thermal heat sensors, pressure sensors, temperature sensors, force sensors, vibration sensors, piezo sensors, fluid property sensors, visual sensors and humidity sensors. Such sensors (80) may be attached directly to each livestock animal or to fixed locations within range of livestock animals such that the location and movement of livestock (75) may be tracked and displayed on the graphical user interface, as shown in FIG. 4. In this regard, each livestock animal may include an appropriate identification tag that may be detected by one or more of the sensors (80).

FIG. 4 also shows examples of fixed features (70) associated with a particular property (55), in particular, a fence (70A) forming a boundary of a particular zone (65), and a road (70B) directly adjacent the fence (70A). Additional examples of fixed features (70) may include water and/or feed storage tanks, sheds, and any other fixed features for which monitoring may be useful in order to provide relevant information regarding a particular unusual occurrence (85) or emergency condition (90), or which may be useful in relation to addressing such occurrences or conditions.

Segment 500 of FIG. 1 shows examples of different alert and recommendation interfaces (190) which may be generated based upon the detection of an unusual occurrence (85) and/or emergency condition (90). For example, one of the unusual occurrences detected may relate to a broken fence (70A) which will enable the user (30) to understand in which particular zone (65) the broken fence is located and, by doing so, the user (30) may determine the severity of the occurrence. For example, in circumstances where the broken fence is located adjacent to a road, the severity may be considered higher than an internal broken fence within the same property. The other unusual occurrence (85) depicted in FIG. 5 relates to a lack of motion detected in a particular livestock animal (75), which enables the user (30) to dispatch relevant personnel to the zone (65) in which the occurrence has been detected in order to examine the animal. For example, an alert may be generated where movement has not been detected in relation to a particular animal for a predetermined amount of time.

In addition to alerting the user (30) with respect to the unusual occurrence (85) and/or emergency condition (90), one or more recommendations may be displayed in relation to remedial action that may be taken to address the unusual occurrence (85) and/or emergency condition (90). The recommendation(s) may be based upon the severity of the unusual occurrence (85) and/or emergency condition (90), wherein the alert presented to the user (30) may be provided as a high or low level alert depending upon the severity. For example, where a road is located adjacent to a broken fence through which livestock may escape, this may give rise to a higher level alert than when a broken fence is detected within a zone that does not pose as significant a threat to livestock.

In another example, the recommendation(s) may be based upon whether the fixed features (70) within vicinity of a detected unusual occurrence (85) and/or emergency condition (80) may be useful in relation to addressing same (e.g. where the location of water storage, for example, relative to a zone (65) of the property (55) in which a fire has been detected, is sufficiently close to the zone (65) to enable use of the stored water to extinguish the fire). In other words, where a fire is detected in a particular zone (65), the relative location of a water storage tank or similar feature may be automatically determined, and the recommendation provided to the user (30) may be to access the particular water storage facility in order to extinguish the fire. There are various other examples of fixed features (70) on a property which may be utilised to address different unusual occurrences (85) or emergency conditions (90), which are not all described herein in the interest of brevity.

Segment 600 of FIG. 1 shows an example of how the user (30) may communicate particular alerts to other persons selected by the user (30) through an alert sharing interface (210). As described earlier, the property owner (30) may not necessarily be based at the property (55), or the property may be of a sufficient land area that the property owner (30) may not be able to quickly and/or easily access the particular zone (65) requiring attention and hence may be reliant upon others (e.g. staff located closer to the particular zone (65)) to address such occurrences (85) and/or emergencies (90). In this regard, the software application (40) may automatically present to the user (30) a selection of associated users to whom a particular alert may be forwarded based upon the profile of the users, e.g. those users determined as being best placed to address the unusual occurrence and/or emergency condition.

For example, a particular worker associated with a property owner (30) may reside on the property (55) in or adjacent to a particular zone (65) in which the unusual occurrence (85) and/or emergency condition (90) has been detected. On that basis, the software application (40) may determine a match between the particular worker and the zone (65) requiring attention based on their relative locations, which will enable the user (30) to quickly view the recommendation provided to them and address the unusual occurrence (85) and/or emergency condition (90) by selecting to proceed with a recommendation to forward the alert to the particular worker.

The software application (40) may also provide a rating/award facility in which users (30) may be ranked according to particular attributes including their response to emergency conditions (85) and/or unusual occurrences (90). For example, this may be based upon their response time, and their effectiveness when addressing the unusual occurrence (85) and/or emergency condition (90). Such ratings may be entered by the property owner (30) and/or a manager associated with the particular property (30). Those registered users (30) who are ranked higher than others may also receive rewards (e.g. additional cash bonuses, etc) and/or appear higher in a particular listing of users presented to the property owner (30) for selection when other unusual occurrences (85) and/or emergency conditions (90) arise. In other words, where there are incentives (e.g. financial) for workers to be selected over other workers to address unusual occurrences (85) and/or emergency conditions (90) within a property, it will be in their interest to appear prominently in results presented to the property owner (30) to increase prospects of selection by the property owner (30) to perform additional remedial action.

Figure 7:
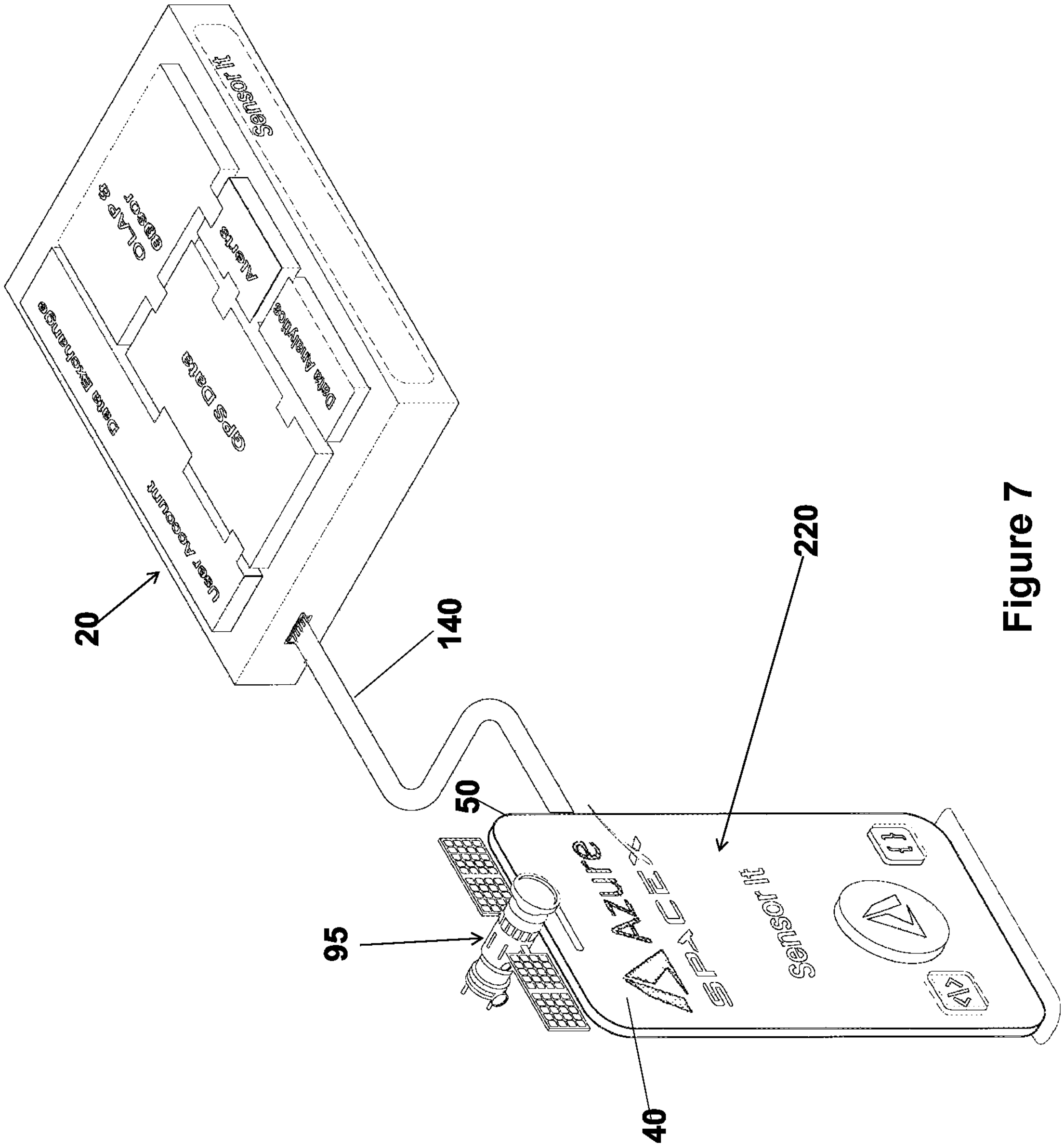
FIG. 7 illustrates an example of an interface in which an alternative service (satellite) may be utilised in the event of loss of WIFI or cell signal communications.

FIG. 7 shows in greater detail Segment 700 of FIG. 1 and, in particular, an example interface (220) relating to network service selection in relation to user communications. In this regard, general communications associated with the software application (40) will involve communications via an available WiFi or cell signal. However, there may be situations (particularly emergency situations) where WiFi and cell signal communications become unavailable. The interface (220) may alert the user (30) in such circumstances, and the user device (50) may be automatically directed such that the user device (50) can continue to exchange (send and receive) data and thereby continue to generate the graphical user interfaces described herein via an alternative wireless service, such as a satellite-based service (95). In addition, the strongest satellite reception available may be automatically selected to effect such communications.

It will be appreciated by persons skilled in the relevant field of technology that numerous variations and/or modifications may be made to the invention as detailed in the embodiments without departing from the spirit or scope of the invention as broadly described. The present embodiments are, therefore, to be considered in all aspects as illustrative and not restrictive.

Throughout this specification and claims which follow, unless the context requires otherwise, the word “comprise”, and variations such as “comprises” and “comprising”, will be understood to imply the inclusion of a stated feature or step, or group of features or steps, but not the exclusion of any other feature or step or group of features or steps.

The invention claimed is:

1. A computer-implemented method of determining and displaying details regarding unusual occurrences and/or emergency conditions within a livestock property, the method comprising:

receiving, by one or more processors, property data from or on behalf of a user in relation to one or more properties, the property data comprising:

boundary details defining an area of land within the property and different zones within the area of land, and details relating to any fixed features of the one or more properties;

receiving, by one or more processors, livestock data from or on behalf of the user, the livestock data comprising:

details relating to livestock on the one or more properties, comprising:

livestock associated with each identified zone;

communicating, by one or more processors, with a plurality of sensors disposed across the one or more properties and/or with one or more external third party services, each configured to monitor an unusual occurrence and/or emergency condition associated with one or more of the different zones and/or the fixed features of the one or more properties;

processing, by one or more processors, data from the plurality of sensors and/or external third party services to determine any unusual occurrence and/or emergency condition which has occurred, or is occurring, within one or more of the different zones or with respect to the fixed features, comprising:

applying, by one or more processors, one or more artificial intelligence techniques to the received data, the artificial intelligence technique(s) configured to:

generate output regarding the most likely unusual occurrence and/or emergency condition which has occurred, or is occurring, within one or more of the different zones or with respect to the fixed features; and generate a severity score for each detected unusual occurrence and/or emergency condition, wherein the severity score is based on any one or more of:

a category of unusual occurrence and/or emergency condition that is detected;

a number of livestock and/or humans detected at or within a predetermined vicinity of the particular location at which the unusual occurrence and/or emergency situation has been detected;

a location of the property and/or zone in which the unusual occurrence and/or emergency condition has been detected and relative distance to particular fixed features of the property likely to exacerbate the unusual occurrence and/or emergency situation; or location of the property and/or zone in which the unusual occurrence and/or emergency condition has been detected and relative distance to a resource capable of being used to address the unusual occurrence and/or emergency condition, comprising one or more of particular fixed features of the property likely to assist the user to address the unusual occurrence and/or emergency, and any one or more external emergency services;

generating, by one or more processors, a graphical user interface (GUI) viewable on a device associated with the user, the GUI comprising a visualization of the area of land of the property, comprising indication(s) of the fixed features and the boundaries that define the different zones, and the type and location of the unusual occurrence or emergency condition; and generating, by one or more processors, one or more recommendations relating to remedial action recommended to address the unusual occurrence and/or emergency condition, wherein the recommendation(s) are based on any one or more of:

the category of unusual occurrence and/or emergency condition detected;

the severity score determined for the unusual occurrence and/or emergency condition detected;

a determination of whether any of the one or more external emergency services is determined as useful to address the unusual occurrence and/or emergency condition;

the location of the one or more external emergency services determined as useful to address the unusual occurrence and/or emergency condition;

a determination of whether any of the fixed features of the property in which the unusual occurrence and/or emergency condition has been detected is useful to address the unusual occurrence and/or emergency condition; or the location of the fixed features determined as useful to address the unusual occurrence and/or emergency condition.

2. The method of claim 1, wherein the outputs regarding the most likely unusual occurrence and/or emergency condition which occurred, or is occurring, within one or more the different zones or with respect to the fixed features comprise any one or more of:

unusual movement of livestock;

cessation of movement of livestock;

entry of livestock into a different zone;

missing livestock;

damage detected to a fixed feature;

wildfire;

flood;

road block;

earthquake;

water damage; or extreme weather event comprising strong winds, typhoon and/or tsunami.

3. The method of claim 1, further comprising:

receiving, by one or more processors, feedback data from the user regarding the accuracy or otherwise regarding the generated outputs, training, based on the received property and livestock data, the generated outputs, and the received feedback data, a machine learning model configured to receive new or updated property and livestock data and generate new or updated outputs regarding the most likely unusual occurrence and/or emergency condition which occurred, or is occurring, within one or more different zones or with respect to the fixed features.

4. The method of claim 1, wherein the one or more external emergency services comprises any one or more of a police station, a fire station, or a hospital.

5. The method of claim 1, wherein the fixed features of the one or more properties comprises any one or more of:

water outlets;

water and/or feed storage tanks;

roads;

sheds; or fencing.

6. The method of claim 1, further comprising:

prompting, by one or more processors, the user to register to use an application that is accessible on the user device, the application enabling the user to upload the property data and livestock data during a registration process, and/or prompting, by one or more processors, the user to register to use an application that is accessible on the user device, the application enabling the user to retrieve the property data and livestock data from an external source.

7. The method of claim 1, wherein the external third party service configured to monitor an unusual occurrence and/or emergency condition comprises an emergency authority whose data systems are accessible using an application programming interface (API) enabling live data exchange.

8. The method of claim 1, wherein the plurality of sensors disposed across the one or more properties comprises any one or more of:

internet of things (IoT) devices;
position sensors;
animal thermal heat sensors;
pressure sensors;
temperature sensors;
force sensors;
vibration sensors;
piezo sensors;
fluid property sensors;
visual sensors; or
humidity sensors.

9. The method of claim 1, wherein the one or more sensors is attached directly to each livestock animal or to a fixed or moving structure within a predetermined distance of the livestock animals to enable the location and movement of the livestock to be tracked by the one or more sensors and included in the displayed visualization of the area of land of the property.

10. The method of claim 1, wherein communication with the user device is via an available WIFI or cell signal communication service.

11. The method of claim 10, wherein where WIFI and cell signal communication services are unavailable, the communication with the user device is automatically re-directed such that the user device continues to generate the GUI using an alternative wireless service.

12. The method of claim 11, wherein the alternative wireless service is a satellite-based service.

13. The method of claim 12, further comprising:

determining, by one or more processors, the strongest satellite reception available based on analysing a plurality of available satellite receptions, and selecting, by one or more processors, the strongest satellite reception available to effect the communication.

14. A computer-implemented system for determining and displaying details regarding unusual occurrences and/or emergency conditions within a livestock property, the system comprising:

one or more processors configured to:

receive property data from or on behalf of a user in relation to one or more properties, the property data comprising:

boundary details defining an area of land within the property and different zones within the area of land, and details relating to any fixed features of the one or more properties;

receive livestock data from or on behalf of the user, the livestock data comprising:

details relating to livestock on the one or more properties, comprising livestock associated with each identified zone;

communicate with a plurality of sensors disposed across the one or more properties and/or with one or more external third party services, each configured to monitor an unusual occurrence and/or emergency condition associated with one or more of the different zones and/or the fixed features of the one or more properties;

process data from the plurality of sensors and/or external third party services to determine any unusual occurrence and/or emergency condition which has occurred, or is occurring, within one or more of the different zones or with respect to the fixed features, comprising:

applying, by one or more processors, one or more artificial intelligence techniques to the received data, the artificial intelligence technique(s) configured to:

generate output regarding the most likely unusual occurrence and/or emergency condition which has occurred, or is occurring, within one or more of the different zones or with respect to the fixed features; and generate a severity score for each detected unusual occurrence and/or emergency condition, wherein the severity score is based on any one or more of:

a category of unusual occurrence and/or emergency condition that is detected;

a number of livestock and/or humans detected at or within a predetermined vicinity of the particular location at which the unusual occurrence and/or emergency situation has been detected;

a location of the property and/or zone in which the unusual occurrence and/or emergency condition has been detected and relative distance to particular fixed features of the property likely to exacerbate the unusual occurrence and/or emergency situation; or a location of the property and/or zone in which the unusual occurrence and/or emergency condition has been detected and relative distance to a resource capable of being used to address the unusual occurrence and/or emergency condition, comprising one or more of particular fixed features of the property likely to assist the user to address the unusual occurrence and/or emergency, and one or more external emergency services;

generate a graphical user interface (GUI) viewable on a device associated with the user, the GUI comprising visualization of the area of land of the property, comprising indication(s) of the fixed features and the boundaries that define the different zones, and the type and location of the unusual occurrence or emergency condition; and generating, by one or more processors, one or more recommendations relating to remedial action recommended to address the unusual occurrence and/or emergency condition, wherein the recommendation(s) are based on any one or more of:

the category of unusual occurrence and/or emergency condition that is detected;

the severity score determined for the unusual occurrence and/or emergency condition detected;

a determination of whether any of the one or more external emergency services is determined as useful to address the unusual occurrence and/or emergency condition;

the location of the one or more external emergency services determined as useful to address the unusual occurrence and/or emergency condition;

a determination of whether any of the fixed features of the property in which the unusual occurrence and/or emergency condition has been detected is useful to address the unusual occurrence and/or emergency condition; or the location of the fixed features determined as useful to address the unusual occurrence and/or emergency condition.

15. A non-transitory computer-readable medium having a plurality of computer instructions stored therein and executable by one or more processors of a computing device for determining and displaying details regarding unusual occurrences and/or emergency conditions within a livestock property, the instructions comprising:

receiving property data from or on behalf of a user in relation to one or more properties, the property data comprising:

boundary details defining an area of land within the property and different zones within the area of land, and details relating to any fixed features of the one or more properties;

receiving livestock data from or on behalf of the user, the livestock data comprising:

details relating to livestock on the one or more properties, comprising livestock associated with each identified zone;

communicating with a plurality of sensors disposed across the one or more properties and/or with one or more external third party services, each configured to monitor an unusual occurrence and/or emergency condition associated with one or more of the different zones and/or the fixed features of the one or more properties;

processing data from the plurality of sensors and/or external third party services to determine any unusual occurrence and/or emergency condition which has occurred, or is occurring, within one or more of the different zones or with respect to the fixed features, comprising:

applying, by one or more processors, one or more artificial intelligence techniques to the received data, the artificial intelligence technique(s) configured to:

generate output regarding the most likely unusual occurrence and/or emergency condition which has occurred, or is occurring, within one or more of the different zones or with respect to the fixed features; and generate a severity score for each detected unusual occurrence and/or emergency condition, wherein the severity score is based on any one or more of:

a category of unusual occurrence and/or emergency condition that is detected;

a number of livestock and/or humans detected at or within a predetermined vicinity of the particular location at which the unusual occurrence and/or emergency situation has been detected;

a location of the property and/or zone in which the unusual occurrence and/or emergency condition has been detected and relative distance to particular fixed features of the property likely to exacerbate the unusual occurrence and/or emergency situation; or a location of the property and/or zone in which the unusual occurrence and/or emergency condition has been detected and relative distance to a resource capable of being used to address the unusual occurrence and/or emergency condition, comprising one or more of particular fixed features of the property likely to assist the user to address the unusual occurrence and/or emergency, and any one or more external emergency services;

generating a graphical user interface (GUI) viewable on a device associated with the user, the GUI comprising a visualization of the area of land of the property, comprising indication(s) of the fixed features and the boundaries that define the different zones, and the type and location of the unusual occurrence or emergency condition; and generating, by one or more processors, one or more recommendations relating to remedial action recommended to address the unusual occurrence and/or emergency condition, wherein the recommendation(s) are based on one or more of:

the category of unusual occurrence and/or emergency condition detected;

the severity score determined for the unusual occurrence and/or emergency condition detected;

a determination of whether any of the one or more external emergency services is determined as useful to address the unusual occurrence and/or emergency condition;

the location of the one or more external emergency services determined as useful to address the unusual occurrence and/or emergency condition;

a determination of whether any of the fixed features of the property in which the unusual occurrence and/or emergency condition has been detected is useful to address the unusual occurrence and/or emergency condition; or the location of the fixed features determined as useful to address the unusual occurrence and/or emergency condition.

* * * * *